Patented Oct. 12, 1926.

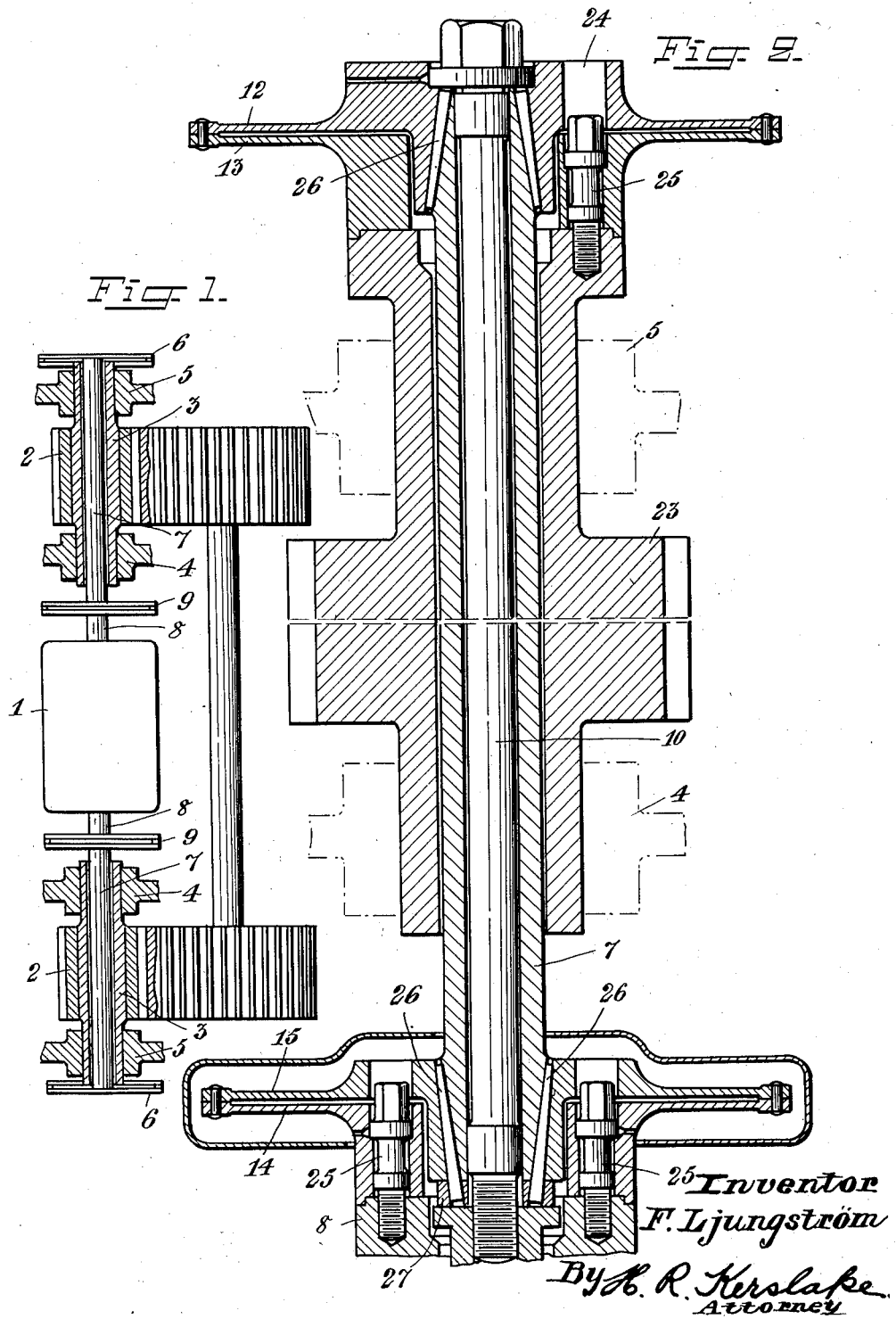

1,602,983

UNITED STATES PATENT OFFICE.

FREDRIK LJUNGSTRÖM, OF BREVIK, LIDINGON, SWEDEN, ASSIGNOR TO AKTIEBOLAGET LJUNGSTRÖMS ANGTURBIN, OF STOCKHOLM, SWEDEN, A CORPORATION.

ELASTIC COUPLING.

Application filed September 14, 1920, Serial No. 410,193, and in Sweden August 4, 1919.

This invention relates to an elastic coupling between a driving and a driven member in which toothed wheels are movable in relation to each other, and the object of the invention is to permit certain movements of a wheel shaft relatively to a driving shaft.

The invention is characterized by a shaft axially movable through a pinion and provided outside the same with diaphragm couplings, one of which is connected with the pinion, the other one being connected with the driving shaft.

Two embodiments of the invention are illustrated in the accompanying drawing in which:—

Fig. 1 is a partial longitudinal section of toothed wheel gears provided with couplings constructed according to the invention.

Fig. 2 shows on a larger scale the right part of the device illustrated in Fig. 1.

In Fig. 1, 1 designates a motor at each side connected symmetrically with a toothed wheel gear.

The wheel 2 of the gear rotates with the same speed as the motor shaft and is mounted on a sleeve or pipe 3 journalled outside the gear wheel in bearings 4 and 5. The sleeve or pipe is connected at the one end by means of a diaphragm coupling 6 with a shaft 7 passing through the sleeve, the shaft 7 being connected with the motor shaft 8 by means of a diaphragm coupling 9. In this manner certain movements of wheel 2 may take place without the motor shaft 8 being necessitated to change its position, and at the same time longitudinal extensions of the shafts are not injurious to the motor nor to the gear.

In the embodiment shown in Fig. 2 the pinion 2 and the sleeve 3 form an integral piece 23. This piece is attached at the one end by means of bolts 25 to one part 13 of the diaphragm coupling. The hub of the other part 12 of the diaphragm coupling is provided with apertures 24, corresponding to said bolts 25 and allowing access to the bolts. The diaphragm 12 is fixed by means of a conical fastening device to the shaft 7 to which also one diaphragm 15 of the other coupling is attached by the aid of a conical fastening device. Said conical fastening devices are kept in place by means of a bolt 10 passing through the shaft 7. The conical wedges 26 pertaining to one of said conical fastening devices are passed with their thicker ends through a separate fastening ring 27. The driving shaft 8 and the diaphragm 14 are connected as stated above by means of bolts 25.

The diaphragm coupling can simply consist of two elastic discs, the centers of which are connected with the shafts, the peripheries of the discs being interconnected or vice versa.

The diaphragm couplings described above may be substituted by equivalent devices permitting movements in all directions except the direction of rotation.

What I claim as new and desire to secure by Letters Patent of the United States is:—

1. Elastic coupling means between a toothed gear wheel and a driving shaft comprising a shaft passing through the gear wheel and movable radially and axially in the latter, a bearing for the said gear wheel, and diaphragm couplings provided at each side of the said bearing, said diaphragm couplings comprising each two diaphragms and being connected to the shaft passing through the gear wheel and to the gear wheel and the driving shaft, respectively, so as to allow of both axial and radial movements of the shaft passing through the gear wheel relatively to the driving shaft.

2. In combination, a driven shaft, one member of a first diaphragm coupling fixed to said shaft, a second member of said diaphragm coupling having its periphery connected to the periphery of the first member, a second shaft fixed to the second member of said diaphragm coupling and arranged coaxial to the driving shaft, a first member of a second diaphragm coupling connected to the second shaft, a second member of the second diaphragm coupling having its periphery connected to the periphery of the first member of the second coupling, a gear wheel fixed to the second member of the second diaphragm coupling, surrounding the second shaft and spaced from the latter, and bearings for said gear wheel.

In testimony whereof I affix my signature.

FREDRIK LJUNGSTRÖM.